United States Patent [19]

Shew

[11] Patent Number: 4,560,095
[45] Date of Patent: Dec. 24, 1985

[54] LEVER OPERATED LUBRICATOR

[75] Inventor: Jerry D. Shew, Niles, Ill.

[73] Assignee: Stewart-Warner Corporation, Chicago, Ill.

[21] Appl. No.: 472,590

[22] Filed: Mar. 7, 1983

[51] Int. Cl.⁴ .............................................. G01F 11/04
[52] U.S. Cl. .................................... 222/256; 222/326; 222/383; 29/156.4 R; 264/323
[58] Field of Search ................................. 222/256–263, 222/383, 372, 380, 325–327; 184/38 R, 28, 105 A, 38 A, 38 B, 38 C; 417/DIG. 1; 29/156.4 R; 264/323

[56] References Cited

U.S. PATENT DOCUMENTS 2,612,296  9/1952  Campbell et al. ............... 222/256 X
3,338,478  8/1967  Hedblad ........................... 222/256 X
3,580,429  5/1971  Trindle ............................. 222/327

Primary Examiner—Charles A. Marmor
Attorney, Agent, or Firm—A. G. Douvas; D. V. Allen

[57] ABSTRACT

A practically all plastic lever operated grease gun with a flexible plastic link integrally molded with a plastic head, pivotally connecting the lever to the head. A lever reciprocated dispensing piston, slidably mounted in a transverse bore in the head, actually forms the bore in the head as a core pin during head molding.

14 Claims, 14 Drawing Figures

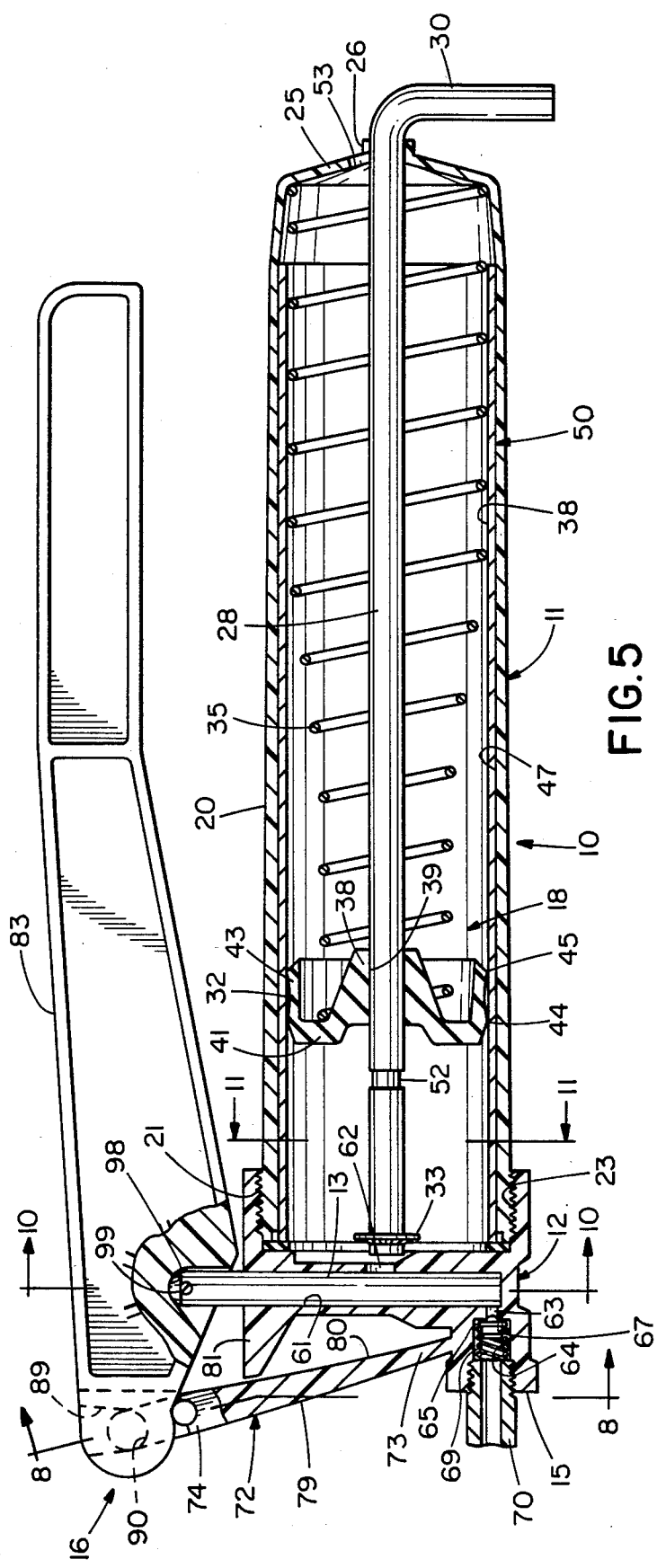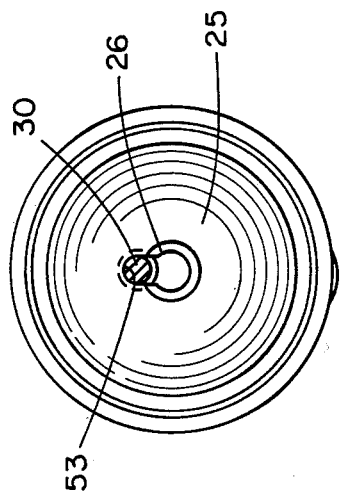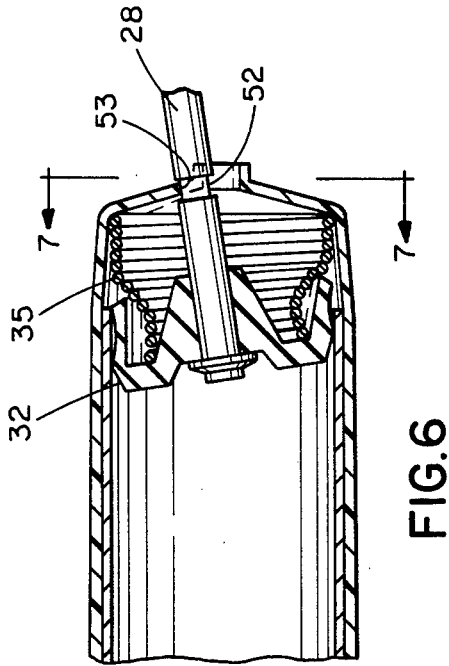

LEVER OPERATED LUBRICATOR

BACKGROUND OF THE PRESENT INVENTION

Manually operated small lubricators, commonly referred to as "grease guns", have found considerable success in the past several decades in the private consumer market frequently for personal automobile lubrication. These lubricators usually include a cylinder with one closed end that acts as a reservoir for grease which is loaded into the cylinder in several ways, one being with a prefilled cartridge and others by bulk loading lubricant directly into the cylinder. The cylinder has an open end that is closed by a dispensing head that has a piston reciprocably mounted therein that forces lubricant under pressure through an outlet fitting usually extending forwardly from the head. The highly viscous lubricant is urged forwardly in the cylinder toward the head by the continuous force of a spring biased follower assembly in the rear of the cylinder that frequently includes an elastomeric follower that actually is a piston having a diameter equal to or somewhat larger than the inside diameter of the cylinder.

This dispensing piston is reciprocated in the head by a lever, frequently constructed of sheet metal, that is pivotally connected to the head by a sheet metal link and also pivotally connected to the end of the piston which projects from the head. The link is necessary to accommodate the crank-like movement of the lever as it reciprocates the piston linearly. The link is usually fastened to both the head and the end of the lever by rivets and the piston is connected to the lever in the same manner.

The head itself is usually constructed of metal and requires machining after casting of the outlet fitting, the cylinder receiving portion, the inlet and outlet passages as well as the main bore in the head that slidably receives the piston.

The intermediate link and the casting and multiple machining operations required to form the head contribute significantly to the cost of the overall grease gun and render the grease gun too expensive for a large segment of consumers.

It is a primary object of the present invention to ameliorate the problems noted above in prior hand held and operated lubrication devices.

SUMMARY OF THE PRESENT INVENTION

In accordance with the present invention a lever operated lubricator or "grease gun" is constructed almost entirely of plastic and it has a structural integrity matching that of metal lubricators while eliminating expensive machining operations, pivotal links, and riveting associated with the manufacture of all known lubricators today.

Toward these ends the present grease gun includes a cylinder, a head, a lever and follower, all constructed of plastic materials. The head may be constructed of a glass filled nylon or polypropylene or even an unfilled polypropylene. The cylinder is constructed of a transparent polypropylene that permits the cartridge label to be inspected without disassembly in cases where the cylinder is cartridge filled, and permits the lubricant level to be inspected when the cylinder is bulk loaded. The lever rather than being manufactured of sheet metal as in prior lubricators, is constructed of a glass filled polypropylene or nylon. And the follower and check valve or poppet are both constructed of a 70 Shore A durometer polyurethane.

An important aspect of the present invention is the elimination of the connecting link between the head and the end of the lever to accommodate the crank geometry of the lever as it drives the piston in linear reciprocating motion. To accommodate the cranking movement of the lever according to the present invention, the head is molded with an integral plastic flexible link extending generally forwardly and transversely from the front of the head. The end of the link has an integral cylindrical boss that is received in a T-slot in the end of the lever and it is held in this slot by a pair of integral stops formed on the link near the link boss. The boss, the stops and link are all molded integrally with the head and thus require no subsequent machining or assembling operations after molding the head.

The projecting end of the piston is mounted in a socket in the bottom of the lever by a conventional rivet that permits the lever to pivot about the end of the piston as the lever is pumped to dispense lubricant.

The lever is simply assembled to the head and the piston by inserting the link boss in the T-shaped lever recess and then swinging the lever about 90 degrees to a position where the link stops lock the lever to the link boss while permitting free pivotal movement therebetween, and then riveting the piston in the socket in the lower forward part of the lever. None of this assembly operation requires any machining and the only assembly operation that requires the use of any tools is the riveting of the piston end into the lever socket.

An important aspect of the present invention is the achievement of close tolerances between the piston and the head bore without requiring careful machining of the metal piston. The clearance between the piston and the bore in a 10,000 PSI lever gun must not exceed 0.001 inch and in fact on grease guns in use today piston and bore diameters are held to within 0.0003 inch and 0.0005 inch respectively. To do this both the piston and the bore in the head in grease guns known today must be very carefully machined. This careful machining is eliminated in the present grease gun by using the piston itself as a core pin for the head bore in the mold cavity for the plastic head itself. Thus the plastic head is molded about the same piston that will be in the finally assembled lubricator. This totally eliminates the requirement for careful machining of the piston as well as the head bore. In fact, due to the inherent torque multiplication provided by the lever, the assembled grease gun can be delivered to the dealer for sale without ever freeing the piston-core pin from the head bore. This freeing action is simply done by the user himself the first time he operates the gun and does not require any significant amount of effort. Because the core pin is the final piston used in the assembly, the tolerance between the piston and the head bore can actually be held much closer than can be achieved even with the most conservative tolerance holding in the present separate machining of the pistons and the heads.

BRIEF DESCRIPTION OF THE DRAWINGS

FIG. 5 is an enlarged longitudinal section of the lever operated lubricator illustrated in FIGS. 1 and 2;

FIG. 6 is a longitudinal fragmentary section of the rear end of the cylinder illustrated in FIG. 5 with the follower locked in its retracted position;

FIG. 7 is a rear view of the cylinder with the follower locked in its retracted position;

DETAILED DESCRIPTION OF THE PREFERRED EMBODIMENT

Figure 1:
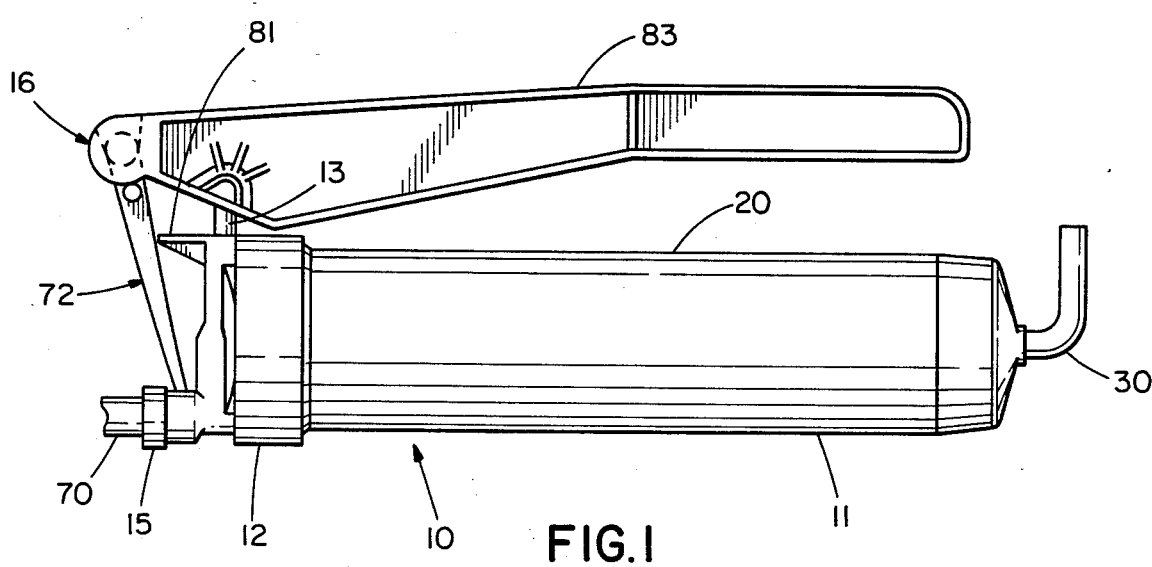
FIG. 1 is a side view of a lever operated lubricator according to the present invention.
Figure 2:
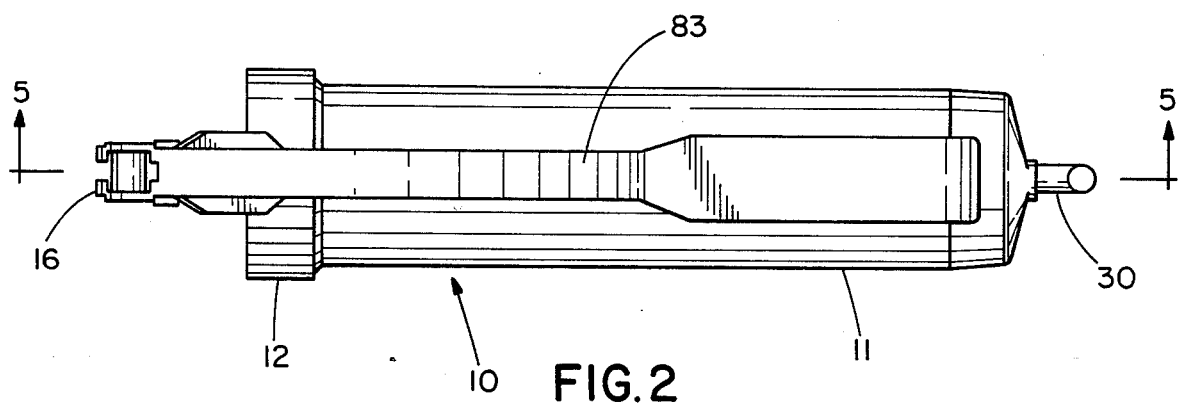
FIG. 2 is a top view of the lever operated lubricator illustrated in FIG. 1.
Figure 3:
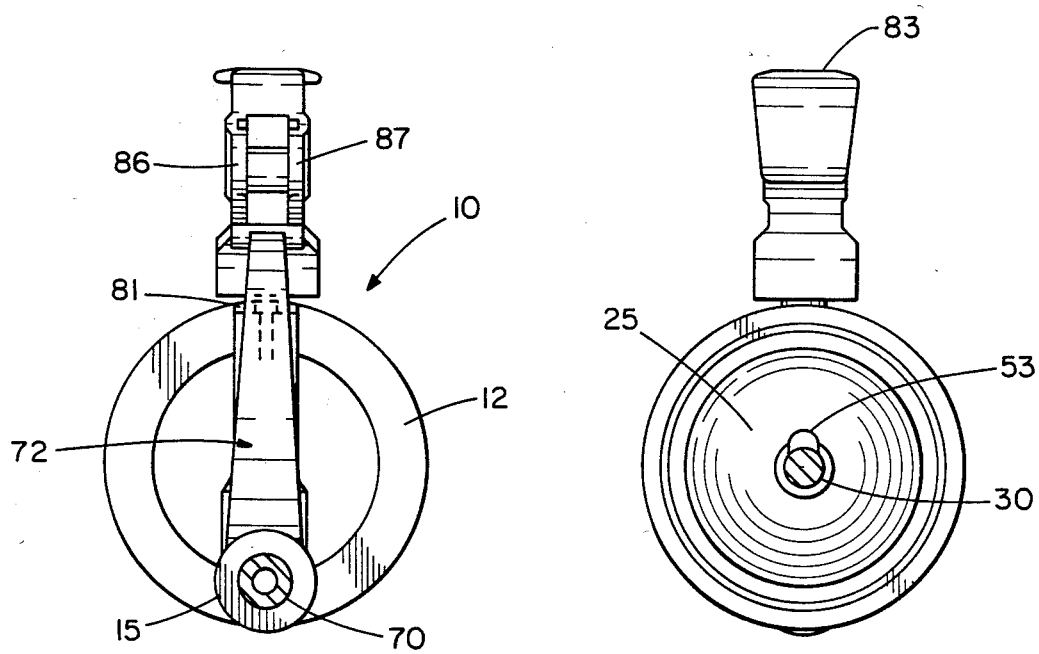
FIG. 3 is an enlarged front view of the lever operated lubricator illustrated in FIGS. 1 and 2.
Figure 4:
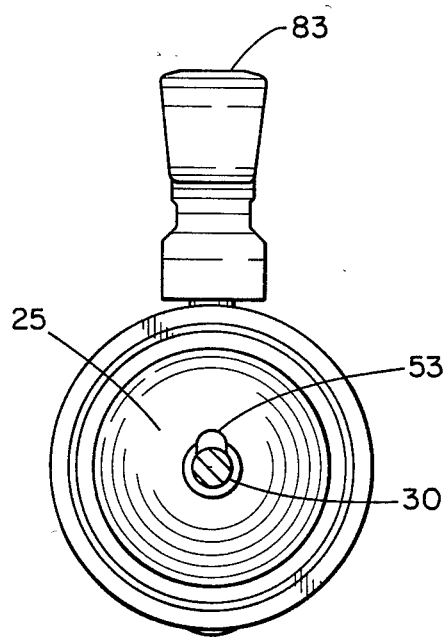
FIG. 4 is a rear view of the lever operated lubricator illustrated in FIGS. 1 and 2.

Referring to the drawings and particularly FIGS. 1 to 6, a lever operated lubricator or grease gun 10 is illustrated generally including an elongated plastic cylinder 11 adapted to receive lubricant, a generally cup-shaped plastic head 12 having a metal piston 13 slidable therein that delivers lubricant under pressure through an integral outlet fitting 15, and a plastic lever assembly 16 for reciprocating the piston 13 in the head 12. A follower assembly 18 is mounted in the cylinder 11 and urges lubricant therein toward the head 12.

The cylinder 11 is cylindrical in configuration and is constructed of a one-piece transparent plastic molding such as transparent polypropylene, and is seen to include an elongated annular wall 20 having a threaded end 21 threadedly received in a mating threaded counterbore 23 in the head 12. The cylinder has an integral rear end wall 25 with a rearwardly extending annular boss 26 that slidably receives a follower rod 28 in the follower assembly 18 that has an L-shaped end portion 30 that defines a handle for withdrawing the follower assembly 18 in the cylinder 11.

The follower assembly 18 includes rod 28, an elastomeric follower 32 slidable on the rod 28, follower stop nut 33 and a variable rate coil compression spring 35 that continuously urges the follower 32 forwardly. Follower rod 28 itself is steel and the follower 32 is preferably constructed of an elastomeric material such as polyurethane having a Shore A durometer of approximately 70. Follower 32 includes a frusto-conical boss 38 having a throughbore 39 slidably mounted on the follower rod 28, and a radially outwardly extending portion 41 and a rearwardly directed generally frusto-conical wall 43 having annular crown portions 44 and 45 that define sealing lips that slidably engage and seal against either cylinder inner wall 47 or cartridge inner wall 38.

Figure 13:
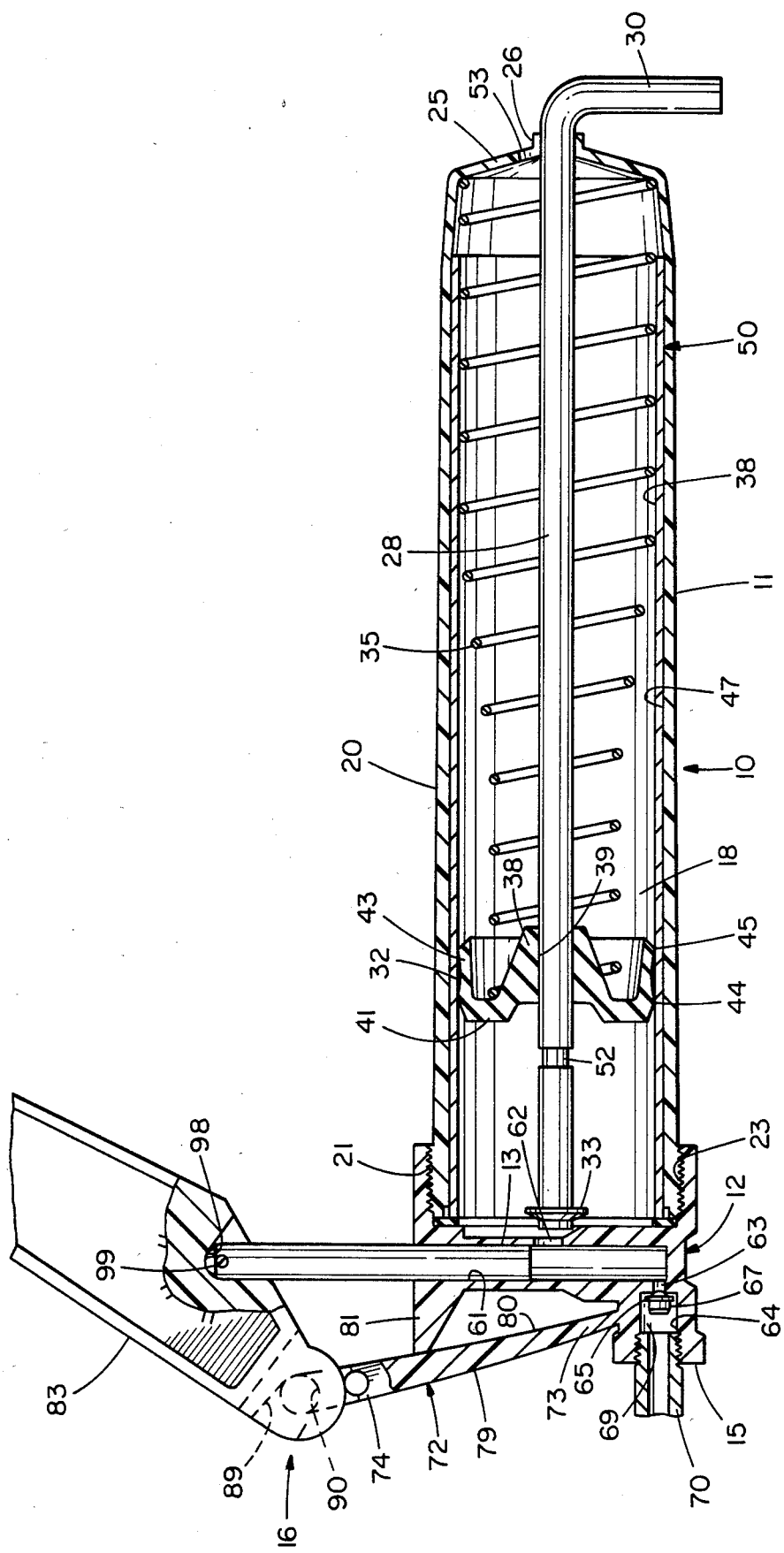
FIG. 13 is a longitudinal section similar to FIG. 5 with the lever and piston in their extreme outward positions.
Figure 14:
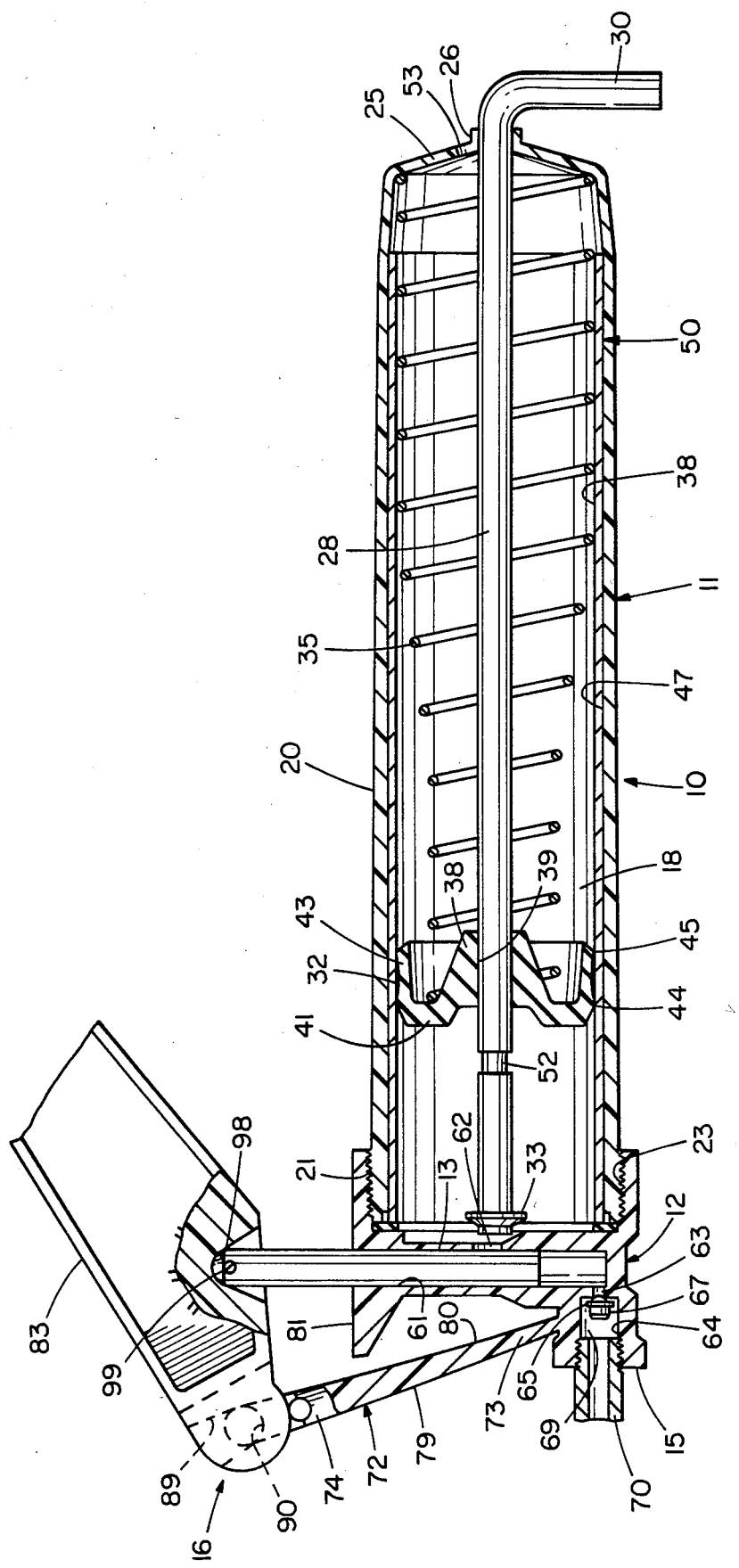
FIG. 14 is a longitudinal section similar to FIG. 13 with the lever and piston in intermediate positions illustrating flexing of the head link.

It should be understood that the lubricator 10 as illustrated in FIGS. 5, 13 and 14 has a prefilled cartridge 50 in the cylinder 11 but the cylinder may also be bulk filled with grease by conventionally known bulk loading techniques.

The follower rod 28 has a reduced land 52 that engages a semi-circular recess 53 in the cylinder rear wall 25 adjacent the boss 26 and this holds and locks follower 32 in its retracted position illustrated in FIG. 6 compressing the variable rate coil compression spring 35. The follower assembly 18 is placed in this position prior to loading bulk lubricant or a cartridge into the cylinder, and after rethreading the cylinder into head 12, the follower rod 28 is released from recess 53 and the spring 35 then urges follower 32 forwardly in the cylinder or in a cartridge 50 forcing the lubricant toward the head 12.

Because the cylinder 11 is constructed of transparent plastic, the user may easily see labels conventionally found on cartridges 50 to identify the lubricant in the gun 10, or more importantly the user can view the lubricant level in the cylinder 11 when the cylinder is bulk loaded without disassembling the cylinder from the head.

Figure 12:
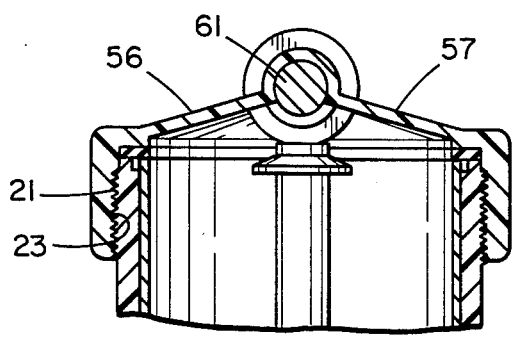
FIG. 12 is a fragmentary section taken generally along line 12—12 of FIG. 11 illustrating the piston bore forming boss in the head.

The dispensing head 12 is generally cup-shaped in configuration and is preferably constructed of a plastic such as glass filled nylon or polypropylene or even unfilled polypropylene. Head 12 includes slightly forwardly converging front walls 56 and 57 as seen clearly in FIG. 12 connected to a pair of spaced cylindrical bosses 58 and 59 that define piston bore 61. An opening 62 between the bosses 58 and 59 defines the inlet for the passage of lubricant from within the cylinder 11 into the bore 61 when the piston is in its outward position illustrated in FIG. 13.

The forwardly directed integral outlet fitting 15 molded integrally with the head 12, and it has a reduced outlet passage 63 communicating with lower end of bore 61 that opens to an enlarged outlet bore portion 64 defining a valve seat 65 against which an elastomeric poppet valve 67 seats with the continuous biasing force of a coil compression spring 69. Poppet 67 forms a one-way check valve permitting flow only outwardly through passage 63 as piston 13 moves downwardly in bore 61, and blocks flow in the opposite direction through passage 63 as piston 13 moves upwardly so that after piston 13 moves upwardly opening inlet passage 63 it will draw lubricant into bore 61. A flexible outlet hose 70 is threadedly connected to fitting 15 and it carries a suitable lubricant fitting (not shown) at its distal end.

An important aspect of the present invention is the close tolerances between piston 13 and bore 61, achieved consistently throughout high volume manufacture. This is achieved by using the piston 13, which is a formed steel rod, as the core pin in forming bore 61. Head 12 is formed in a plastic injection mold and prior to each mold cycle, one of the pistons 13 is placed in the mold as a core pin and the heated plastic material is injected therearound as the molding cycle proceeds. Piston-core pin 13 is not removed from the head 12 after molding, but instead remains in the head during assembly of the remaining parts and may be easily freed from the bore 61 for reciprocation therein during the first operation of the gun by the user. It can readily be seen that when using this manufacturing technique, a very close fit is achieved between piston 13 and bore 61 even though the tolerances on the pistons 13 are not accurately controlled.

Figure 8:
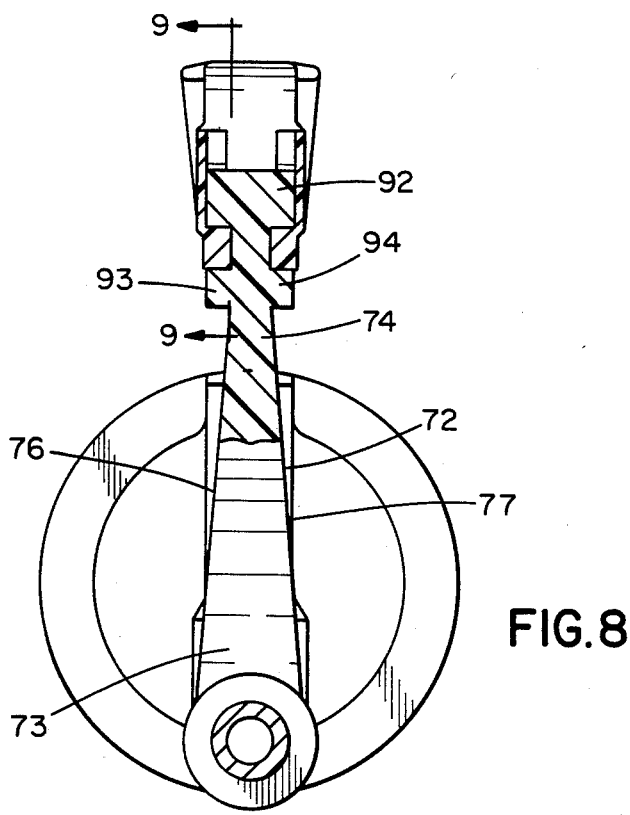
FIG. 8 is a partly fragmented enlarged front view of the present lubricator taken generally along line 8—8 of FIG. 5 illustrating the lever-link pivotal connection.
Figure 9:
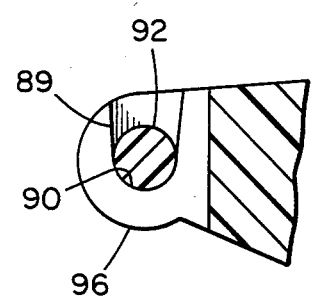
FIG. 9 is a fragmentary section taken generally along line 9—9 of FIG. 8 illustrating the lever-link pivotal connection.
Figure 11:
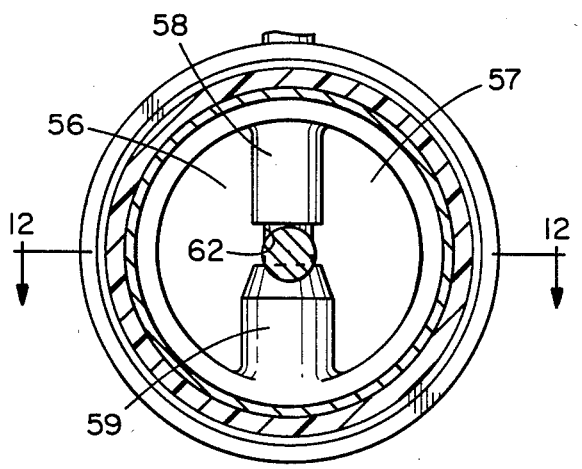
FIG. 11 is a cross-section taken generally along line 11—11 of FIG. 5 illustrating the piston bore forming boss in the head.
Figure 10:
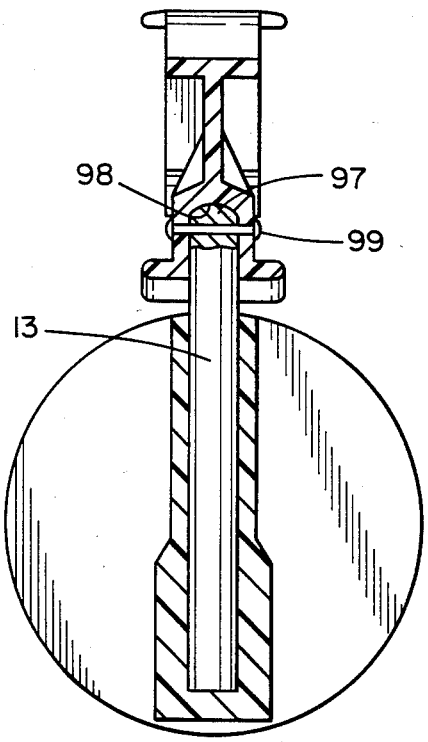
FIG. 10 is a cross-section taken generally along line 10—10 of FIG. 5 illustrating the piston connection to the socket on the underside of the lever.

The head 12 has an integrally molded generally transversely and forwardly extending link 72 that eliminates the necessity for rivets and metal links to accommodate the crank geometry of the lever assembly 16. The link 72 has a wide lower portion 73 and a narrow outer portion 74 defined by outwardly converging side walls 76 and 77 in the plane of FIG. 8, and a narrow lower portion 73 and a wide upper portion 74 in an axial plane defined by outwardly diverging forward and rear walls 79 and 80 as seen in FIG. 5. The walls 79 and 80 are sufficiently close together at lower portion 73 to give the link 72 flexibility in the lower portion 73 in an axial plane. The upper portion 72 is substantially rigid in an axial plane and its narrow width facilitates connection to the lever assembly 16. Link 72 in its relaxed position is forwardly spaced slightly from a forwardly extending stop 81 on head 12, and is illustrated in its relaxed position in FIG. 14 when the lever assembly 16 is rotated about to its mid-stroke position.

The handle assembly 16 includes an elongated handle 83 that is preferably constructed of one-piece plastic molding of a suitable plastic such as glass filled polypropylene or nylon. Lever 83 acts as a crank to reciprocate piston 13 in bore 61 under the hand grasp manual movement of the user. As seen more clearly in FIGS. 5 and 8, the lever 83 is bifurcated at its forward end defining parallel spaced arcuate bosses 86 and 87 each of which has an upwardly opening slot 89 therein with an arcuate lower surface 90. The slots 89 in the bifurcated bosses 86 and 87 together define a T-shaped slot in which an integral transverse boss 92 on the end of link 72 is pivotally mounted.

The handle 83 is assembled to the link 72 by hooking the recesses 89 over the boss 92 with the handle rotated approximately 90 degrees from its position illustrated in FIGS. 1 and 5. Thereafter the handle is rotated to the position shown in FIGS. 1 and 5 locking the boss 92 in the recess 89 with a pair of integral cylindrical stops 93 and 94 on link 72 that ride on arcuate surfaces 96 on spacedlever bosses 86 and 87. This eliminates the requirement for any rivets or other fastening elements to attach the lever to the link. The piston 13 has a spherical end surface 97 that is pivotally mounted in a complementary spherical socket 98 formed in the lever 83, and is pivotally connected thereto by transverse rivet 99.

With the lever 83 in its innermost position illustrated in FIG. 5, piston 13 will engage the bottom of bore 61 and the link 72 will be slightly spaced from stop 81 although the link 72 in that position bends slightly axially in a rearward direction from its relaxed position illustrated in FIG. 14. As the operator rotates lever 83 outwardly during the suction stroke, poppet 67 will close and lever 83 begins to pull piston 13 outwardly in head bore 61. As the lever 83 moves from its position illustrated in FIG. 5 to the position illustrated in FIG. 14, the link 72 will bend axially forwardly a short distance to accommodate the crank geometry of the lever and piston. As lever 83 is moved further outwardly during the suction stroke from its position illustrated in FIG. 14, the lever will bend the link 72 in a rearward axial direction until the link engages stop 81 in the position illustrated in FIG. 13. Thus stop 81 limits the outward movement of lever 83 and determines the maximum stroke for piston 13. This movement draws lubricant through inlet passage 62 into bore 61. The user then depresses lever 83 closing inlet port 62 and forcing lubricant in bore 61 under high pressure through outlet passage 63 opening poppet valve 67 and dispensing lubricant through outlet hose 70.

I claim:

1. A hand operated lubricant dispenser, comprising; a cylinder adapted to receive lubricant in either bulk form or in a cartridge, a one-piece plastic head member enclosing one end of the cylinder having a bore therein communicating with the interior of the cylinder, said head member having an outlet fitting communicating with the bore, a piston slidable in and projecting from the bore, adapted to dispense lubricant in the bore through the outlet fitting under high pressure, a spring biased follower assembly in the cylinder adapted to force lubricant in the cylinder forwardly toward the head member and into the head bore, a lever assembly for reciprocating the piston in the head bore including a flexible plastic link integrally molded with and rigidly connected to the head member at one end and having a pivotal connector at its other end proximal to the piston, and a lever pivotally connected to the link connector at one end thereof and also pivotally connected to the projecting end of the piston, whereby as the lever is manually pivoted about the link connector the piston will be driven linearly as the link flexes to accommodate the geometry of the lever and piston.

2. A hand operated lubricant dispenser, as defined in claim 1, wherein the cylinder is constructed of a transparent plastic so that the lubricant level or cartridge may be observed without disassembling the cylinder from the head.

3. A hand operated lubricant dispenser, comprising; a cylinder adapted to receive lubricant in either bulk form or in a cartridge, a head member enclosing one end of the cylinder having a bore therein communicating with the interior of the cylinder, said head member having an outlet fitting communicating with the bore, a piston slidable in and projecting from the bore, adapted to dispense lubricant in the bore through the outlet fitting under high pressure, a spring biased follower assembly in the cylinder adapted to force lubricant in the cylinder forwardly toward the head member and into the head bore, a lever assembly for reciprocating the piston in the head bore including a flexible plastic link rigidly connected to the head member at one end and having a pivotal connector at its other end proximal to the piston, and a lever pivotally connected to the link connector at one end thereof and also pivotally connected to the projecting end of the piston, whereby as the lever is manually pivoted about the link connector the piston will be driven linearly as the link flexes to accommodate the geometry of the lever and piston, the piston being metal and the head being plastic, said piston being insert molded in the head to form the head bore.

4. A hand operated lubricant dispenser, comprising; a cylinder adapted to receive lubricant to be dispensed, a one-piece plastic head enclosing one end of the cylinder having an inlet opening communicating with the interior of the cylinder and an outlet opening, a cylindrical bore in the head communicating at one end with the inlet opening and at its other end with the outlet opening, a piston slidably mounted in the bore and projecting partly from the head, a follower assembly in the cylinder for urging lubricant therein toward the head and the inlet opening therein, a lever assembly for reciprocating the piston including an integrally molded plastic link extending outwardly from the head having an integral cylindrical pivot boss at the end thereof, said link having a transverse width greater than its axial thickness adjacent the head sufficient to enable the link to flex in an axial direction, and a plastic lever having a recess at one end thereof to pivotally receive the link pivot boss, said plastic lever having an integral socket for pivotally connecting the projecting end of the piston to the lever so that the piston is reciprocated as the lever is pivoted about the link.

5. A hand operated lubricant dispenser, as defined in claim 4, wherein the link has a transverse width less than its axial thickness adjacent the link pivot boss.

6. A hand operated lubricant dispenser, as defined in claim 4, wherein the lever is a one-piece plastic molding and said cylinder is constructed of a transparent plastic so the lubricant level may be observed.

7. A hand operated lubricant dispenser, as defined in claim 4, wherein the head has an annular integral forwardly extending boss surrounding the outlet opening, said link extending generally transversely from the annular boss, and an integral stop extending axially from the head generally diametrically opposite the annular boss positioned to engage the link and limit its rearward movement as well as the outward movement of the lever.

8. A hand operated lubricant dispenser, as defined in claim 4, said recess in the lever for receiving the link pivot boss opening to the side of the lever normally opposite the link so that the pivot boss is inserted in the recess by rotating the lever before attachment of the piston approximately 90 degrees from its innermost position, and an integral stop on the link spaced from the pivot boss that engages the lever to prevent translating movement of the pivot boss in the lever recess after its insertion therein and after attachment of the piston.

9. A hand operated lubricant dispenser, comprising; a cylinder adapted to receive lubricant to be dispensed, a one-piece plastic head enclosing one end of the cylinder having an inlet opening communicating with the interior of the cylinder and an outlet opening, a cylindrical bore in the head communicating at one end with the inlet opening and at its other end with the outlet opening, a piston slidably mounted in the bore projecting from the head, a lever assembly for reciprocating the piston including an integrally molded plastic link extending outwardly from the head having an integral cylindrical pivot boss at the end thereof, said link having a transverse width greater than its axial thickness adjacent the head sufficient to enable the link flex in an axial direction, a plastic lever having a recess at one end thereof to pivotally receive the link pivot boss, said plastic lever having an integral socket for pivotally connecting the projecting end of the piston to the lever so that the piston is reciprocated as the lever is pivoted about the link, said link having a transverse width less than its axial thickness adjacent the link pivot boss, said head having an annular integral forwardly extending boss surrounding the outlet opening, said link extending generally transversely from the annular boss, an integral stop extending axially from the head generally diametrically opposite the annular boss positioned to engage the link and limit its rearward movement as well as the outward movement of the lever, said recess in the lever for receiving the link pivot boss opening to the side of the lever normally opposite the link so that the pivot boss may be inserted in the recess by rotating the lever before attachment of the piston approximately 90 degrees from its innermost position, and an integral stop on the link spaced from the pivot boss that engages the lever to prevent translating movement of the pivot boss in the lever recess after its insertion therein and after attachment of the piston.

10. A hand operated lubricant dispenser, comprising; a cylinder adapted to receive lubricant to be dispensed, a one-piece plastic head enclosing one end of the cylinder having an inlet opening communicating with the interior of the cylinder and an outlet opening, a cylindrical bore in the head communicating at one end with the inlet opening and at its other end with the outlet opening, a piston slidably mounted in the bore and projecting from the head, a follower assembly in the cylinder for urging lubricant therein toward the head and the inlet opening therein, a lever assembly for reciprocating the piston including an integrally molded plastic link extending outwardly from the head having an integral cylindrical pivot boss at the end thereof, said link having a transverse width greater than its axial thickness adjacent the head sufficient to enable the link flex in an axial direction, and a plastic lever having a recess at one end thereof to pivotally receive the link pivot boss, said plastic lever having an integral socket for pivotally connecting the projecting end of the piston to the lever so that the piston is reciprocated as the lever is pivoted about the link, said piston being insert molded in the head to define the bore therein.

11. A method of manufacturing a lever operated lubricator of the type having a cylinder for holding lubricant or grease with a dispensing head at one end of the cylinder that expels lubricant under pressure by the reciprocating motion of a piston in the head, including the steps of: forming a metallic piston, placing the piston in a head mold as an insert to define and form a bore in the head in which the piston may reciprocate, molding plastic in the head mold around the piston, cooling the molded head with the piston therein, and attaching a lever to the same piston to reciprocate the piston in the bore, whereby close tolerance between the piston and the head bore may be achieved without accurate machining of the piston or accurate molding of the head bore.

12. A method of manufacturing a lever operated lubricator of the type having a cylinder for holding lubricant or grease with a dispensing head at one end of the cylinder that expels lubricant under pressure by the reciprocating motion of a piston in the head, including the steps of: forming a metallic piston, placing the piston in a head mold as an insert to define and form a bore in the head in which the piston may reciprocate, molding plastic in the head mold around the piston, cooling the molded head with the piston therein, and attaching a lever to the same piston to reciprocate the piston in the bore without freeing the piston from the head, whereby core pins are eliminated and the purchaser may free the piston from the head upon initial lever movement.

13. A hand operated lubricant dispenser, comprising; a cylinder adapted to receive lubricant in either bulk form or in a cartridge, a head member enclosing one end of the cylinder having a bore therein communicating with the interior of the cylinder, said head having an outlet fitting communicating with the bore, a piston slidable in and projecting from the bore adapted to dispense lubricant in the bore through the outlet fitting under high pressure, and a spring biased follower assembly in the cylinder adapted to force lubricant in the cylinder forwardly toward the head and into the head bore, said piston being constructed of metal and said head being constructed of plastic, said piston being insert molded in the head to define the head bore and maintain close tolerance between the piston and the head bore.

14. A hand operated lubricant dispenser, comprising; a cylinder adapted to receive lubricant in either bulk form or in a cartridge, a head member enclosing one end of the cylinder having a bore therein communicating with the interior of the cylinder, said head having an outlet fitting communicating with the bore, a piston slidable in and projecting from the bore adapted to dispense lubricant in the bore through the outlet fitting under high pressure, and a spring biased follower assembly in the cylinder adapted to force lubricant in the cylinder forwardly toward the head and into the bore, said piston being constructed of metal and said head being constructed of plastic, said piston being insert molded in the head to define the head bore and maintain close tolerance between the piston and the head bore, said cylinder being constructed of transparent plastic so that the lubricant level may be observed without disassembling the cylinder from the head.

* * * * *